United States Patent [19]

Trueblood

[11] 4,076,475
[45] Feb. 28, 1978

[54] PRESSURE INJECTION MACHINE AND METHOD

[75] Inventor: Raymond L. Trueblood, New Carlisle, Ohio

[73] Assignee: Trueblood, Inc., Tipp City, Ohio

[21] Appl. No.: 718,399

[22] Filed: Aug. 27, 1976

Related U.S. Application Data

[60] Continuation of Ser. No. 518,234, Oct. 29, 1974, abandoned, which is a division of Ser. No. 343,903, March 22, 1973, abandoned.

[51] Int. Cl.² .............................................. B29F 1/06
[52] U.S. Cl. .................................... 425/159; 425/156
[58] Field of Search ............... 425/159, 156, 149, 245, 425/146, 155, 166

[56] References Cited

U.S. PATENT DOCUMENTS

| | | | |
|---|---|---|---|
| 3,436,793 | 4/1969 | Trueblood | 425/245 X |
| 3,741,700 | 6/1973 | Hutchinson et al. | 425/159 |

*Primary Examiner*—Francis S. Husar
*Assistant Examiner*—William R. Briggs
*Attorney, Agent, or Firm*—Biebel, French & Nauman

[57] ABSTRACT

A plastic injection machine injects at an initial higher pressure, with the opening of the injection nozzle valve being delayed to allow injection pressure to build up. When the mold is filled, the pressure applied by the machine is shifted to a low holding pressure which is maintained until the plastic beings to set up. A shouldered bronze thrust bearing transmits the high pressure from the hydraulic injection cylinders to the injection machine screw.

2 Claims, 5 Drawing Figures

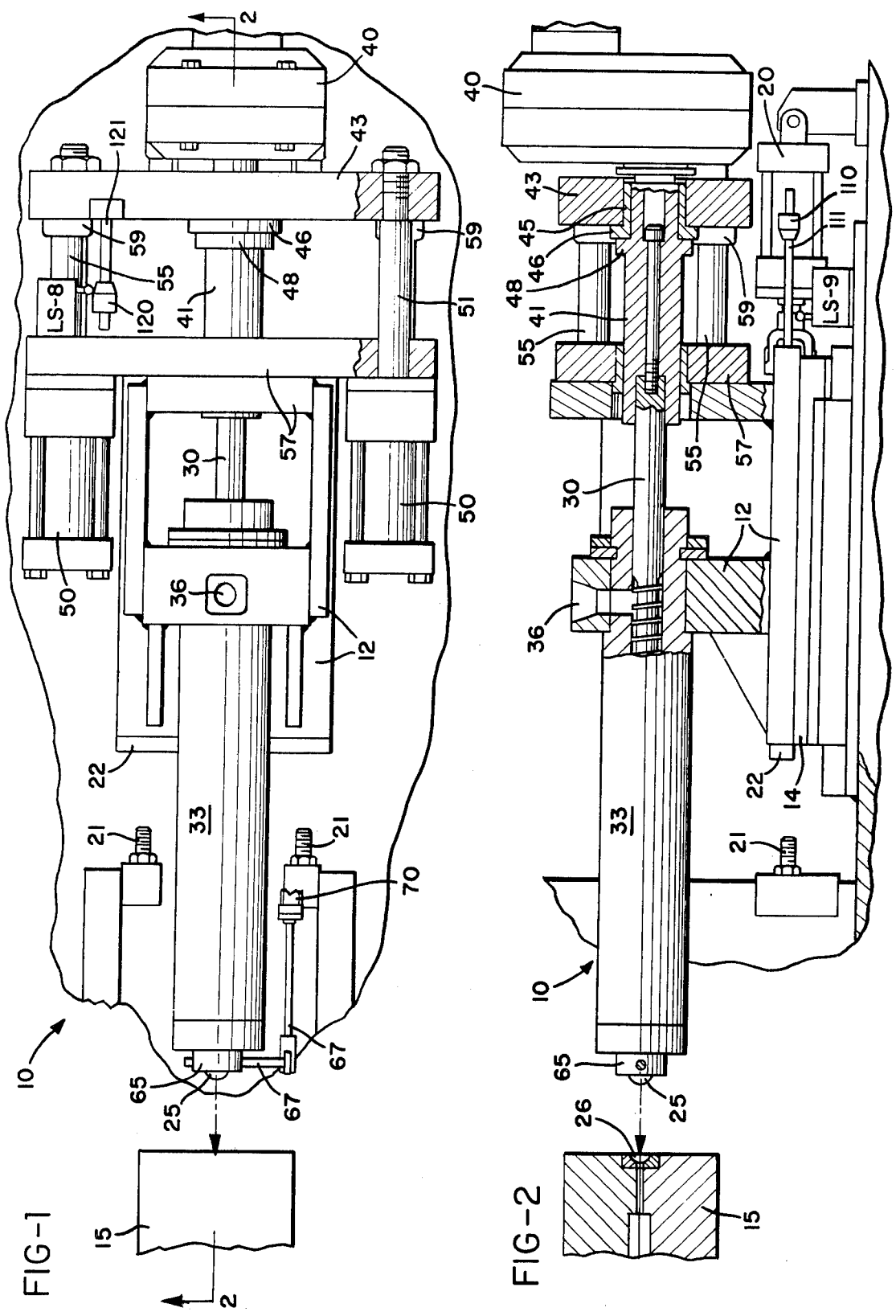

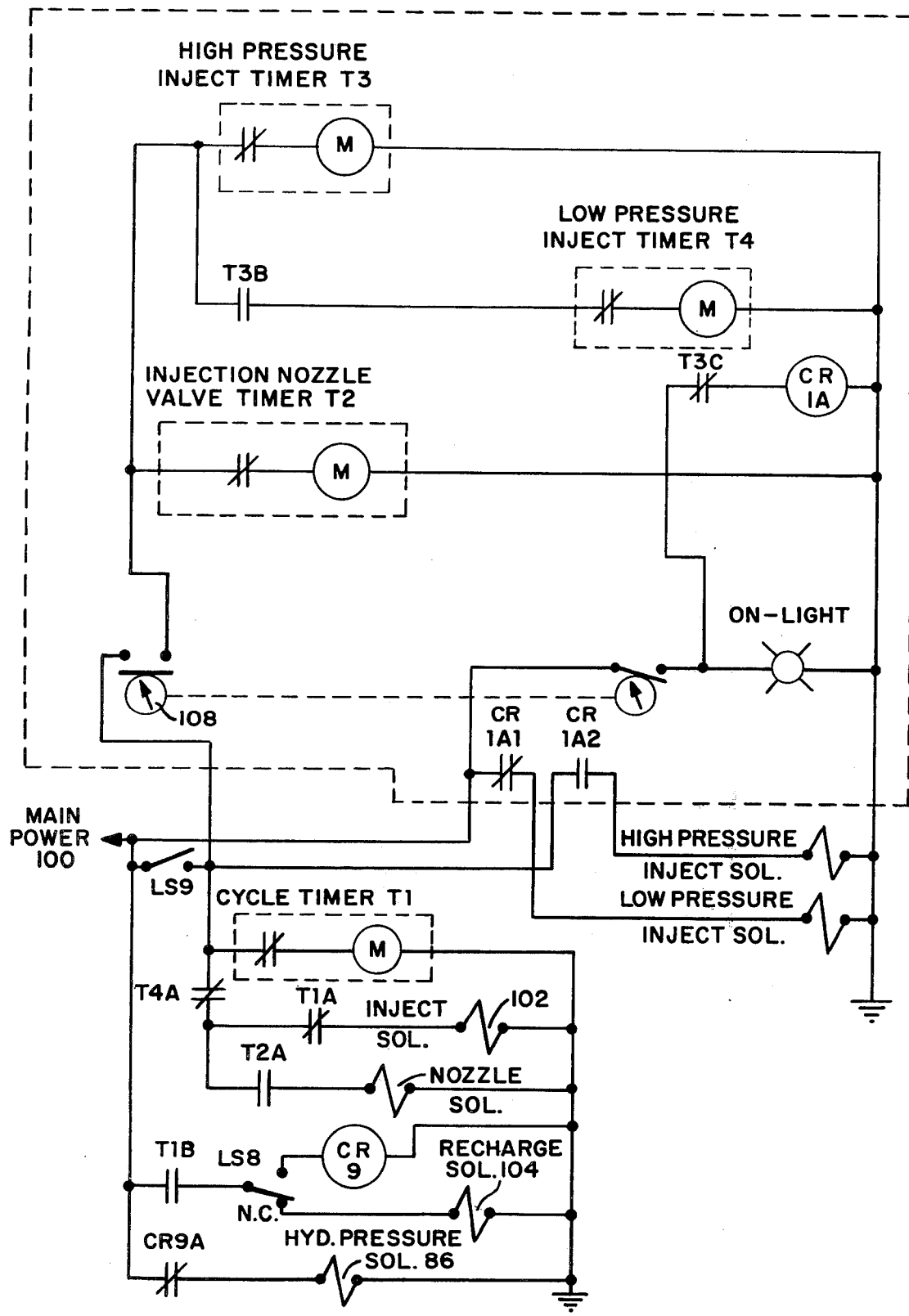

PRESSURE INJECTION MACHINE AND METHOD

This is a continuation of application Ser. No. 518,234 filed Oct. 29, 1974, now abandoned which is a division of Ser. No. 343,903, Abandoned, filed Mar. 22, 1973.

BACKGROUND OF THE INVENTION

This invention relates to plastic injection machines, and more particularly to pressure controls and methods for such a machine and a thrust bearing for transmitting the pressures generated by the injection machine.

Machines for pressure injecting hardenable plastic materials are well known in the art. Examples include U.S. Pat. Nos. 2,318,031, 2,734,226, and 3,436,793. These machines typically plasticize the plastic material and then inject the material under pressure into suitable molds. The injection machine commonly maintains the material in a pressurized state for a finite period of time to assure complete filling of the mold cavities and to prevent loss of size of the finished article due to shrinkage of the plastic material as it is cooled by contact with the walls of the mold.

Such machines have proven quite satisfactory in the injection molding of a wide variety of products. However, there still remain certain drawbacks. For example, the plastic must be injected very rapidly in order to eliminate cold wall freeze offs along the main runner, within the various mold cavities, and the cavity gates. Such rapid injection is accomplished by using very high pressures to drive the plastic into the mold at a high rate of speed.

These same high pressures frequently cause flashing of the mold as the plastic leaks between the mold halves under the high pressure. Extreme clamping forces must therefore be applied to the molds, not only to reduce flashing as far as possible, but also to keep the mold halves tightly adjacent one another. Further, when metal inserts such as wires, metal blades, pins, and so on are included within the mold, the high pressures not infrequently dislodge the inserts from the desired position within the mold. Molded inserts of this type are quite commonly employed in electrical, automotive, appliance, and other items, and the integrity and proper functioning of the molds and the injection machine are therefore of considerable importance.

Since the plastic material is oftentimes plasticized in the injection cylinder barrel by a screw which also serves to pressurize the plastic material during injection, appropriate bearing means must be provided for the screw to withstand the high forces of injection while enabling the screw to be rotated for recharging the machine.

In U.S. Pat. No. 3,436,793, assigned to the same assignee as this invention, there is described and claimed an arrangement by which the opening of the nozzle is somewhat delayed until the plasticized material in the barrel is substantially pressurized by the screw, to provide for the rapid filling and injection into the mold cavity. While the apparatus shown therein has been highly successful, it did not deal with the problem of high pressure flashing or the dislodgement of the metal parts and inserts, as mentioned above.

SUMMARY OF THE INVENTION

Briefly, this invention provides a method and apparatus for pressure injecting flowable, hardenable plastic material in a two pressure-phase injection cycle.

The initial injection is accomplished using a higher than normal pressure. The opening of the nozzle valve, for releasing the plastic material into the mold, is delayed by a timer to allow development of the full high injection pressure within the injection machine barrel.

A high pressure injection control timer controls the period of application of the high pressure to the injection machine, and the injection nozzle delay timer operates simultaneously therewith for controlling the pressure build up. The high pressure injection timer is adjusted to apply the high pressure only for the duration of the injection of the plastic material into the mold. As soon as the mold has been filled, the high pressure injection timer times out, withdraws the high pressure, and starts a low pressure injection timer.

The low pressure injection timer applies a low maintenance pressure to the screw, and therefore to the plastic material within the mold. The timer maintains the low pressure for a period sufficient for the plastic material to chill within the mold, and then times out.

After completion of the low pressure period the machine resumes its normal cycle, recharging for the next injection cycle, and withdrawing from the mold.

Due to the especially high pressure used during the high pressure injection period, a shouldered bronze thrust bearing is employed between the screw and the injection pressure assembly to transmit the injection force to the screw while permitting the screw to rotate during recharging of the machine.

It is therefore an object of this invention to provide a plastic injection machine having low and high pressure injection capabilities; a plastic injection machine in which the plastic material is injected at a high pressure and the material is then allowed to chill while being maintained at a lower pressure; a plastic injection machine in which the opening of the injection valve is delayed to allow full build up of the high injection pressure; a plastic injection machine in which the application of the pressures and the delay of the injection valve is controlled by adjustable timers; a plastic injection machine having a shouldered bronze thrust bearing for carrying the injection forces to the machine screw while allowing rotation of the screw during recharging of the cylinder barrel; and a method for high pressure injection of flowable, hardenable plastic material and low pressure maintenance thereof during an appropriate chill period. It is also an object of the invention to accomplish the above purposes in an inexpensive, uncomplicated, and durable configuration readily adaptable to virtually any pressure injection machine.

Other objects and advantages of the invention will be apparent from the following description, the accompanying drawings and the appended claims.

BRIEF DESCRIPTION OF THE DRAWINGS

FIG. 1 is a plan view of portions of a pressure injection machine and mold according to the present invention;

FIG. 2 is an elevational view, partially in section, of the FIG. 1 machine, taken generally on line 2—2 thereof;

FIG. 3 is a diagram of a portion of the electric control circuit controlling the high and low pressure injection phases;

DESCRIPTION OF THE PREFERRED EMBODIMENT

Figure 4:
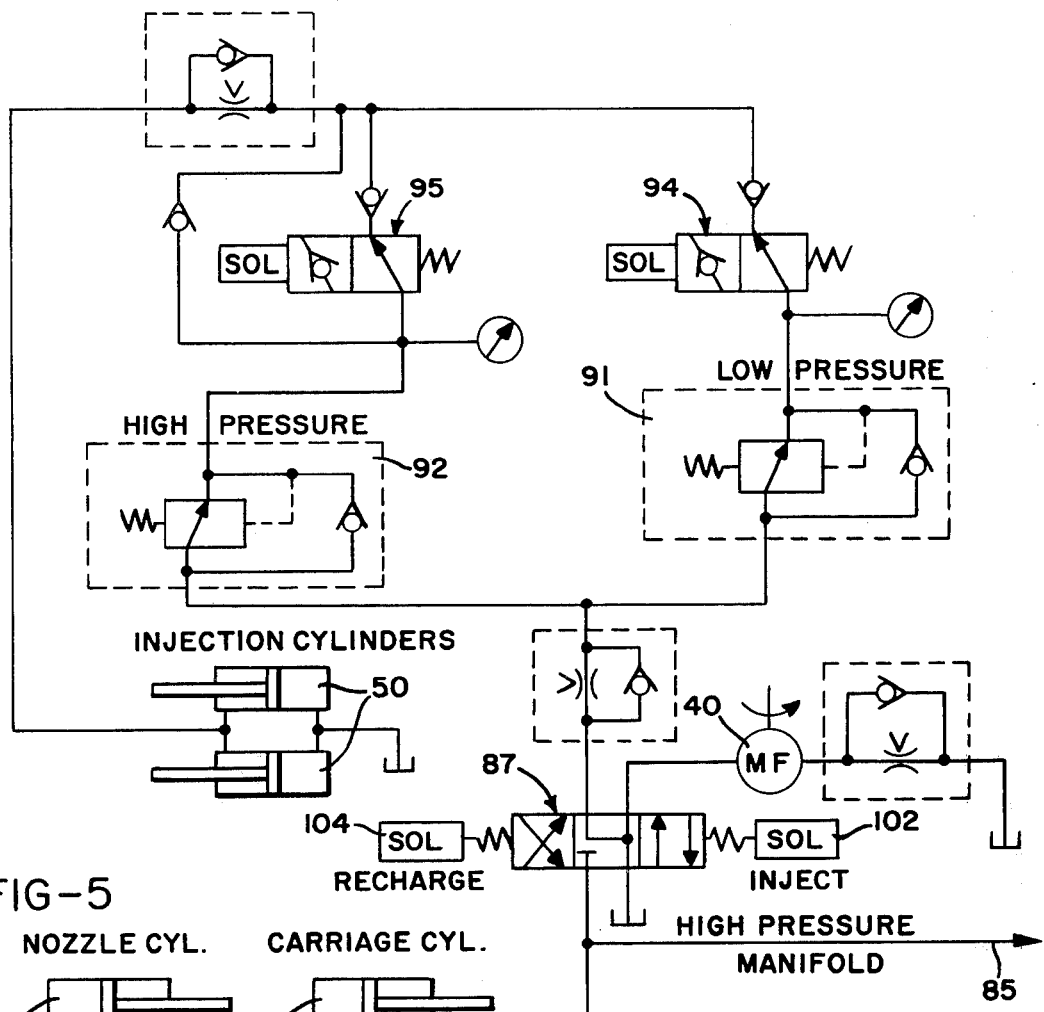
FIG. 4 is a diagram of a portion of the hydraulic system of the FIG. 1 apparatus.

With reference to the drawings, and more particularly to FIGS. 1 and 2, there is illustrated a plastic injection machine 10 substantially of the type shown in U.S. Pat. No. 3,436,793. Machine 10, certain details of which are more particularly described in the above patent, includes a carriage 12 on which the machine is mounted for sliding movement back and forth along a guide rail 14, toward and away from a split mold 15.

It is understood that the parts of the mold 15 are clamped together and held closed with considerable force during injection. The clamp arrangement of my U.S. Pat. No. 3,309,739 is particularly useful for this purpose.

Movement of the machine 10 along the rail 14 is effected by a hydraulic carriage cylinder 20. Adjustment stops 21 engage carriage stop rail 22 for exact adjustment of the forward carriage position, in order to seat the injection nozzle cap 25 properly into the mold nozzle seat 26.

A reciprocating and rotating plasticizing screw 30 is mounted within the cylinder barrel 33, to mix and force plastic material received from the hopper supply inlet 36 toward the nozzle cap 25. Screw 30 is rotated by a hydraulic motor and gear box 40, serving as a drive means, and is drivably coupled thereto by means of an intermediate driver member 41. The driver member 41, in turn, is rotatably supported in a thrust plate 43 by a shouldered bronze thrust bearing 45 having a shoulder 46 thereon. The shoulder 46 is supported by the thrust plate 43 and a boss 48 on the driver member 41, so that axial force from the thrust plate 43 may be transmitted through the shoulder 46 to the boss 48, and from there to the screw 30.

A pair of injection cylinders 50 are mounted on either side of machine 10 and are connected by cylinder rods 51 to the thrust plate 43 for applying an injection force to the thrust plate, and from thence to screw 30. Cylinders 50 themselves are attached directly to carriage 12, and move therewith, so that injection cylinder rods 51 cause the thrust plate 43, hydraulic motor and gear box 40 (mounted on plate 43), driver 41, and screw 30 to move relative to the carriage 12, and hence also relative to the cylinder barrel 33. The injection cylinders 50 are therefore able to drive screw 30 axially of cylinder 33 to pressurize the plastic within the cylinder.

Movement of the injection cylinder rods 51, thrust plate 43, hydraulic motor and gear box 40, driver 41, and screw 30 relative to carriage 12 and cylinder barrel 33 is guided by four guide pins 55 located in pairs on either side of machine 10. The pins 55 are attached to boss members 57 supported on the carriage 12, and are slidably received in bushings 59 in the thrust plate 43, to allow the thrust plate, hydraulic motor and gear box, driver 41, and so on, to slide backwards and forwards thereon with respect to carriage 12 and cylinder barrel 33.

An injection nozzle valve 65 is located at the end of cylinder barrel 33 adjacent nozzle cap 25. The opening and closing of the injection nozzle valve 65 is controlled by crank arms 67 which in turn are actuated by an injection nozzle valve cylinder 70. Movement of the crank arms 67 in one direction, by cylinder 70, opens the injection nozzle valve 65, while movement of the arms in the opposite direction closes the valve, essentially as taught in my U.S. Pat. No. 3,436,793.

Figure 5:
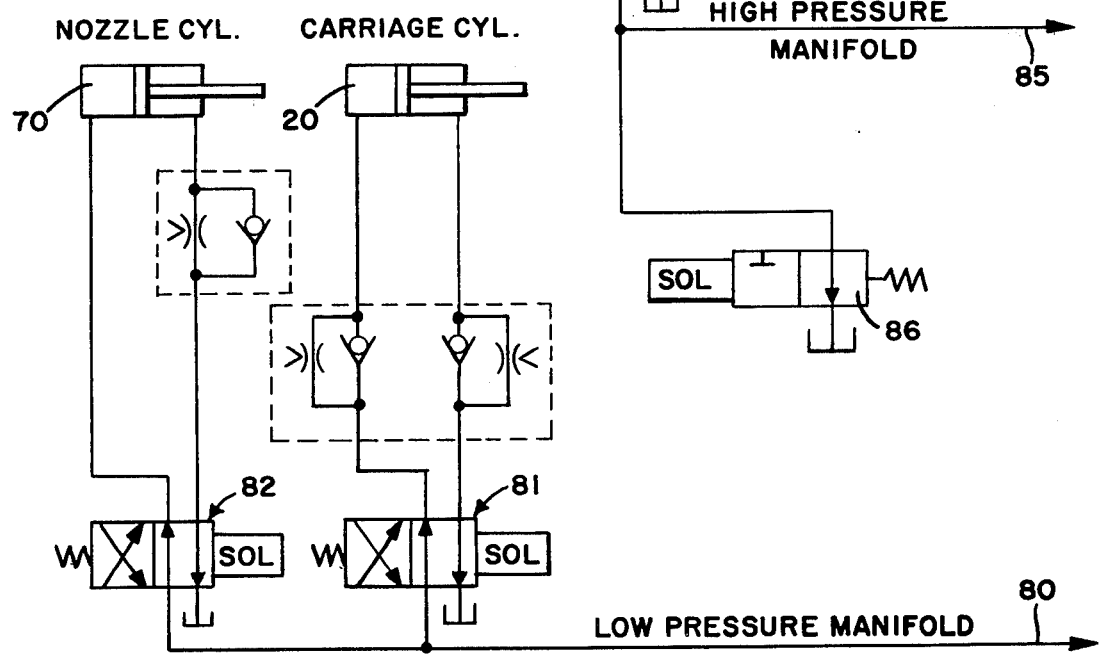
FIG. 5 is a diagram of another portion of the hydraulic system.

The preferred hydraulic circuits for operating the plastic injection machine 10 are illustrated in FIGS. 4 and 5. As may be seen therein, carriage cylinder 20 and injection nozzle cylinder 70 are operated from a low pressure hydraulic source 80, and are controlled by a four-way solenoid-operated carriage cylinder control valve 81 and a similar injection valve control valve 82, respectively.

The injection cylinders 50 and hydraulic motor 40 are operated from a high pressure hydraulic source 85. The application of the high pressure source to the circuit is controlled by a valve 86. A self-centering, closed-center three-way valve 87, when in a first or "recharge" position, controls the delivery of the high pressure hydraulic fluid to the hydraulic screw motor and gear box 40, to recharge cylinder barrel 33 with a new shot of plastic material in conventional fashion. In the center or neutral position, high pressure fluid is not delivered to any function. In the third or "inject" position, high pressure fluid is delivered to the injection cylinders 50 through either a low pressure regulator 91 or a high pressure regulator 92. Delivery of the low pressure hydraulic fluid from the low pressure regulator 91 is controlled by a low pressure valve 94, while delivery from the high pressure regulator 92 is controlled by a high pressure valve 95.

The electric solenoid portions of the hydraulic circuits as shown in FIGS. 4 and 5, are controlled by the simplified circuit diagram shown in FIG. 3. Only so much of the circuit diagram of the hydraulic injection machine is shown as is necessary to describe the mode of operation of the invention. With reference to FIG. 3, a cycle timer T1 is shown, and only the contacts thereof pertaining to the present invention are described. The circuit also includes an injection nozzle valve timer T2, a high pressure timer T3 and a low pressure timer T4. Control relays CR1A and CR9 are also included.

Diagrammatically shown is a limit switch LS9 which is tripped or actuated in the forward position of the carriage, signaling that the nozzle 25 has come to rest in the nozzle seat 26. Also shown is a shot-size limit switch LS8, which is adjustably mounted on the machine as hereinafter described for determining the quantity of plastic material which is mixed and placed at the extruding end of the barrel 33. The switch LS8 is tripped with the rearward movement of the screw when a predetermined shot size has been achieved. The cycle timer T1 determines the overall length of the injection cycle. It is energized by the closing of the limit switch LS9 as signaling that the carriage has reached its forward position. Power from a main power source 100 is applied through closed contacts T1A to the "inject" solenoid 102 of valve 86 so that fluid under high pressure from the source 85 is applied simultaneously to the low pressure control valve 94 and to the high pressure control valve 95.

The high pressure timer T3 controls the length of time that hydraulic fluid under pressure is applied through the regulator 95 to the injection cylinders 50. The low pressure timer T4 is operated from a normally open contact T3B of timer T3 and controls relay CR1A to control the length of time that fluid under low pressure from the regulator 94 is applied to the injection cylinders 50.

The nozzle timer T2 controls the delay in the opening of the nozzle valve 85 following the application of high fluid pressure to the cylinders 50. This delay enables injection pressure to build up in the cylinder barrel 30 ahead of the screw so that opening of the nozzle valve results in a rapid filling of the mold cavity, as previously described. The relay CR1A controls the valves 91 and 92 and thus effects the transfer of pressure control from high to low pressure. An ON/OFF switch 108, in normal operation, is positioned in the ON position, thus connecting timers T2 and T3 to the source 100 of power through the forward limit switch LS9. The control relay CR9, during the injection cycle, is de-energized and thus its normally closed contact applies power to the solenoid of the hydraulic pressure valve 86, permitting pressure from the manifold 85 to be applied to the circuit. However, relay CR9 is energized by the shot size limit switch LS8, upon the movement of the screw to a predetermined rearward position, thus disabling the hydraulic circuit by de-energizing valve 86 and permitting the fluid pressure to be vented to the tank. This is the idle condition of the machine.

In the operation, it is assumed that the switch 108 is moved to its "ON" position and relay CR1A is operated. The carriage 12 is brought forward on its track until the rail 22 rests against the adjustable stops 21, and the nozzle 25 is properly seated. The forward movement is accomplished by the application of fluid pressure to the cylinder 20 by actuation of the carriage solenoid 81 of FIG. 5. The circuit for controlling the solenoid to bring the carriage forward at the beginning of a cycle and to return it to its retracted or rest position at the conclusion of the cycle is conventional with screw-type plastic injection machines and is not incorporated in FIG. 3. The limit switch LS9 signals the forward position of the injection cylinder ready for injection and is tripped by an adjustable cam 110 supported on a rod 111 as shown in FIG. 2.

The closing of the forward limit switch LS9 applies power from the source 100 to the timers T1, T2, and T3 and also applies power through timer contacts T1A to the "inject" solenoid 102 of valve 87. The operation of valve 87 applies fluid under high pressure to the injection cylinders 50 through the high pressure solenoid valve 95 which has been energized through contacts CR1A2 of control relay CR1A. The injection nozzle valve timer T2 is started at the same time, but the opening of the nozzle valve 65 by the nozzle solenoid 82 is delayed for a predetermined short period of time by reason of the open timer contacts T2A. When timer T2 times out, which may be in the order of from 0.5 to 3 seconds, for example, the contacts T2A are closed, thus applying power to the solenoid valve 82 and operating the nozzle cylinder 70, permitting the plastic material to be injected into the mold cavity at high speed and under relatively high pressure.

The low pressure control valve 94 is maintained in a de-energized position by reason of the now open contacts CR1A1.

LS9 also applies power to the high pressure timer T3 and when it times out, the contacts T3B are closed to initiate the operation of the low pressure timer T4. At the same time, power is broken through contacts T3C to the control relay, thus interrupting power to the high pressure valve 95 through contacts CR1A2, and applying power to the low pressure valve 94. Low hydraulic pressure will be maintained on the screw for the remaining portion of the injecting cycle, the duration of which is now controlled by timer T4. When timer T4 times out, contacts T4A interrupt power to the injection solenoid 102, returning it to its neutral position, and to the nozzle cylinder solenoid 82, causing the nozzle valve to be closed.

The cycle timer T1 times out and applies power through contact T1B and the normally closed contacts of limit switch LS8 to the recharge solenoid 104 of valve 87, thus applying power to the hydraulic motor 40 to form a new charge of plastic material in the barrel 33. The screw 30 thus retracts until limit switch LS8 is operated, interrupting power to the recharge solenoid 104, stopping the screw motor 40 and at the same time applying power to control relay CR9. This interrupts power to the hydraulic pressure valve 86, removing the high pressure and placing the system in a standby condition.

The duration of the operation of the high pressure timer T3 is sufficient to insure complete filling of the mold cavity. In a typical example, the mold cavity of 5 oz. capacity may be filled with plastic material in 2 seconds at an initial pressure of 1600 lbs. per sq. in. After this time, there is no need for maintenance of high pressure and, in fact, the withdrawal of high pressure and the transfer to low pressure is desirable to prevent the spreading apart of the mold halves and the dislodgement or movement of any inserts which have been placed in the mold. Accordingly, the injection force is transferred to low pressure by the timing out of timer T3 and the initiation of timer T4. Timer T4 maintains a low pressure which may, for example, be in the order of 300 psi to allow time for the plastic to become somewhat chilled and to make up for any shrinkage which occurs in the plastic material. This may, for example, be in the order of 5 seconds. It is understood that the precise setting of the timers is dependent upon the capacity of the mold, the complexity of the mold cavity, the desired injection pressure used, and the type of material being used. Within the concepts of this invention, these times and pressures may vary widely to obtain the desired quality and finish on the molded part. Further, while separate low pressure timer T4 and cycle timers T1 are disclosed, it is within the scope of the invention to consolidate the function of these timers so that a single timer may be employed for the purpose of terminating the low pressure injection cycle with that of the overall cycle.

As may be seen, therefore, this invention has numerous advantages. A higher than normal injection pressure may be used, since the very high pressure is withdrawn as soon as the mold itself has been filled. High pressure assures complete filling of the mold cavities with no freeze offs, while the low holding pressure eliminates flashing, shifting of inserts, and the need for extreme mold clamp forces. That is, the pressure is not entirely withdrawn, but instead, a low holding pressure is maintained during the curing time to allow proper set up and contraction of the plastic material.

The effectiveness of the very high pressure injection is enhanced by the use of a delay in the opening of the injection valve, to allow for full system pressure build up. The high pressure performance is also enhanced by the special, shouldered bronze thrust bearing which is attached between the screw and the injection compression means to transmit the very high compressive forces to the screw, while permitting rotation of the screw relative to the compression means.

The invention is therefore compatible with presently known pressure injection machines, and is easily and readily adapted thereto.

While the method herein described, and the form of apparatus for carrying this method into effect constitute preferred embodiments of this invention, it is to be understood that the invention is not limited to this precise method and form of apparatus, and that changes may be made in either without departing from the scope of the invention.

What is claimed is:

1. Apparatus for the injection molding of plastic into a mold cavity, comprising an injection cylinder and a hydraulically operated reciprocating ram screw therein, an injection nozzle on said injection cylinder having a controllable nozzle shutoff valve, hydraulic source means providing two fluid pressures to said ram, valve means connected intermediate said hydraulic source means and said ram for selectively applying said fluid pressures to move said ram screw with correspondingly different forces to create a corresponding pair of plastic injection pressures, first timer means establishing a first time interval controlling said valve means to apply a first of said fluid pressure to the injection screw at the beginning of said first interval, a nozzle timer initiated simultaneously with said first timer means and connected to hold said nozzle valve closed for a predetermined short time interval followed by opening said nozzle valve at the conclusion of said short time interval, said first timer means maintaining said first pressure throughout said first time interval to effect injection of the plastic material at said first injection pressure, second timer means establishing a second time interval longer than the intervals of said first timer means and said nozzle timer, said second timer means initiated by the timing out of said first timer means and connected to operate said valve means to apply and maintain the second of said fluid pressures to said screw throughout said second time interval to prevent shrinkage of the plastic within the mold cavity.

2. Apparatus for the injection molding of plastic into a mold cavity, comprising an injection cylinder and a hydraulically operated reciprocating ram screw therein, an injection nozzle on said injection cylinder having a controllable nozzle shutoff valve, hydraulic source means providing two fluid pressures to said ram, valve means connected intermediate said hydraulic source means and said ram for selectively applying said fluid pressures to move said ram screw with correspondingly different injection forces to create a corresponding pair of plastic injection pressures, first timer means establishing a first time interval controlling said valve means to apply a first of said fluid pressures to the injection screw at the beginning of said first interval, delay means responsive to said first timer means connected to open said nozzle valve following the application of said first fluid pressure by said first timer means, said first timer means maintaining said first pressure throughout said first time interval to effect injection of the plastic material at said first pressure, second timer means initiated by the timing out of said first time interval and establishing a second time interval longer than the interval of said first timer means, said second timer means connected to operate said valve means at the timing out of said first timer means to apply and maintain the second of said pressures to said screw throughout said second time interval to prevent shrinkage of the plastic within the mold cavity.

* * * * *